US012703339B2

(12) United States Patent
Passmann

(10) Patent No.: US 12,703,339 B2
(45) Date of Patent: Aug. 11, 2026

(54) VEHICLE BRAKE SYSTEM AND METHOD FOR OPERATING A BRAKE SYSTEM

(71) Applicant: ZF Active Safety GmbH, Koblenz (DE)

(72) Inventor: Andreas Passmann, Hilgert (DE)

(73) Assignee: ZF Active Safety GmbH, Koblenz (DE)

( * ) Notice: Subject to any disclaimer, the term of this patent is extended or adjusted under 35 U.S.C. 154(b) by 439 days.

(21) Appl. No.: 18/186,659

(22) Filed: Mar. 20, 2023

(65) Prior Publication Data

US 2023/0303048 A1 Sep. 28, 2023

(30) Foreign Application Priority Data

Mar. 24, 2022 (DE) ......................... 102022106981.8

(51) Int. Cl.
*B60T 13/74* (2006.01)
*B60T 13/16* (2006.01)
(Continued)

(52) U.S. Cl.
CPC .......... *B60T 13/686* (2013.01); *B60T 13/168* (2013.01); *B60T 13/18* (2013.01); *B60T 17/22* (2013.01);
(Continued)

(58) Field of Classification Search
CPC ................. B60T 13/686; B60T 13/745; B60T 2270/402; B60T 2270/404; B60T 2270/413; B60T 2270/82
See application file for complete search history.

(56) References Cited

U.S. PATENT DOCUMENTS 7,980,638 B2 * 7/2011 Matsuzaki ............ B60T 13/662 303/114.1
2018/0050670 A1 * 2/2018 Feigel .................. B60T 13/662
(Continued)

FOREIGN PATENT DOCUMENTS

DE 102012205861 A1 10/2012
DE 102019211537 A1 2/2021

*Primary Examiner* — Bradley T King
(74) *Attorney, Agent, or Firm* — Kristin L. Murphy

(57) ABSTRACT

A brake system includes a brake command that is electronically transmittable to the brake system. It comprises a first and second electromechanical pressure generating units, that can implement the brake command and that are fluidically connected with one hydraulic brake circuit. Multiple actuator valves are assigned respectively to one brake actuator at a vehicle wheel and can either be pressurized or de-pressurized. Both pressure generating units are designed to supply sufficient brake pressure to actuate all brake actuators. During normal operation the first pressure generating unit supplies the requested brake pressure up to a normal maximal value. Additionally, potential peak brake pressures, that exceed the normal maximum value, are supplied by the second pressure generating unit. In event of failure of the second pressure generating unit the entire brake pressure is supplied by the first pressure generating unit, whereby the brake pressure is limited to the normal maximum value, and in an emergency mode when the first pressure generating unit fails the entire brake pressure in the brake circuit will be supplied via the second pressure generating unit, whereby the brake pressure is limited to the normal maximum value or an emergency maximum value.

15 Claims, 2 Drawing Sheets

(51) Int. Cl.

| | |
|---|---|
| ***B60T 13/18*** | (2006.01) |
| ***B60T 13/68*** | (2006.01) |
| ***B60T 17/22*** | (2006.01) |
| *B60T 15/02* | (2006.01) |
| *B60T 17/02* | (2006.01) |

(52) U.S. Cl.

CPC ............. *B60T 15/028* (2013.01); *B60T 17/02* (2013.01); *B60T 2270/403* (2013.01)

(56) References Cited

U.S. PATENT DOCUMENTS

| | | | | |
|---|---|---|---|---|
| 2018/0334146 | A1* | 11/2018 | Feigel | B60T 13/686 |
| 2018/0334148 | A1* | 11/2018 | Feigel | B60T 13/662 |
| 2018/0334149 | A1* | 11/2018 | Feigel | B60T 13/745 |
| 2019/0344769 | A1* | 11/2019 | Zimmermann | B60T 8/326 |
| 2020/0114894 | A1* | 4/2020 | Leiber | B60T 8/368 |
| 2020/0139948 | A1* | 5/2020 | Leiber | B60T 8/268 |
| 2020/0307538 | A1* | 10/2020 | Ganzel | B60T 8/4081 |
| 2021/0122349 | A1* | 4/2021 | Leiber | B60T 13/662 |
| 2022/0126806 | A1* | 4/2022 | Leiber | F15B 11/17 |
| 2022/0194339 | A1* | 6/2022 | Tarandek | B60T 13/745 |
| 2023/0001908 | A1* | 1/2023 | Einig | B60T 13/745 |
| 2024/0059265 | A1* | 2/2024 | Kim | B60T 17/04 |
| 2024/0217496 | A1* | 7/2024 | Ganzel | B60T 13/686 |
| 2024/0359669 | A1* | 10/2024 | Zhang | B60T 13/142 |

* cited by examiner 10
12
14
16
18
20
21
22
27
28
29
30
32
34
36
38
40
41
42
44
46
48
50
52
M

VEHICLE BRAKE SYSTEM AND METHOD FOR OPERATING A BRAKE SYSTEM

CROSS-REFERENCE TO RELATED APPLICATION

This application claims priority to German Priority Application No. 102022106981.8, filed Mar. 24, 2022, the disclosure of which is incorporated herein by reference in its entirety.

TECHNICAL FIELD

The present disclosure relates to a brake system for vehicle and a method to operate a brake system, for example in case of failure of a pressure generating unit.

BACKGROUND

In known brake systems, actuator valves are coupled with corresponding brake actuators of a vehicle wheel to apply a desired brake pressure to operate the brake actuator. The brake actuator is, for example, a brake caliper which interacts with a brake disc and, for example, includes a fluidic slave cylinder.

In the event that an interaction with a driver is intended, i.e., in a non-autonomous operating mode of the vehicle a driver-brake-request is to be detected, an input device is provided, that in case of a so-called brake-by-wire-system generates only an electric brake command, which is passed to the pressure generating unit. However, if the vehicle is operated in a semi- or fully autonomous operating mode, the pressure generating unit will be addressed by a superior driver-independent control system that transmits the brake command.

As pressure generating units, for example, a plunger type arrangement is used, that includes an electromotive piston which generates the desired fluid pressure in the brake circuit. The plunger type arrangement can be of single- or dual-acting-type.

For the pressure generating unit a redundancy should be present to constantly provide sufficient brake pressure in case of failure of a component, wherefore often multiple pressure generating units are installed.

SUMMARY

What is needed is an enhanced brake system for a vehicle, that can be operated even when a single component fails.

A brake system of a vehicle having an electronic data interface for transmitting a brake command is disclosed, whereby the braking system is designed in such a way, that the brake command can be transmitted exclusively electronically to the brake system. The brake system is having a first and a second electromechanical pressure generating unit, which can implement the brake command and which are hydraulically connected to a hydraulic brake circuit, the brake system having a plurality of actuator valves, each of which is assigned to a brake actuator on a vehicle wheel and each of which can selectively pressurize and de-pressurize the brake. Each of the pressure generating units is designed to apply sufficient braking pressure to actuate all brake actuators.

The disclosure provides a fault tolerant brake system, because if one of the pressure generating units has a failure, the corresponding other pressure generating unit can take over the safe operation of the brake system by itself to build sufficient brake pressure and to address all actuator valves.

In one exemplary arrangement, it is possible to provide an ABS functionality with only one pressure generating unit.

The brake system is designed to be operated with a "dry brake pedal" using the brake-by-wire principle or being operated without a driver input in a semi- or fully autonomous operation mode, whereby one or both of these options can be implemented. If an input device for a driver-brake-request is present, e.g. a pedal simulator, it is not directly mechanical or hydraulically linked to the brake circuit.

In one exemplary arrangement, the two pressure generating units are the only pressure generating units of the brake system, so there is no conventional master cylinder provided, that can be actuated by the driver mechanically in case of failure. Also, additional brake boosters are not needed.

As known, the brake circuit can be operated with suitable hydraulic fluid as brake fluid. A fluid reservoir for brake fluid is present that can supply brake fluid to at least the first pressure generating unit and to which the brake fluid can flow back flow when the brake actuators are de-pressurized, if applicable.

Normally, the first pressure generating unit is in normal operation, during which both pressure generating units are working without failure, the primary pressure generating unit of the brake system.

In one exemplary arrangement, the brake system is designed such that the second pressure generating unit can support the first pressure generating unit in an assist mode to increase an overall pressure in the brake circuit. The assist mode is offered to the brake system during normal operation and helps to supply peak brake pressure in certain situations, that exceeds a normal maximum value, i.e. the highest pressure that is achievable by the first pressure generating unit. In this manner, as an example, peak brake pressures of over 180 bar (180.000 hPa) can be generated by interaction of both pressure generating units.

For example, the pressure boost can occur by a direct increase of the pressure in the brake lines which lead to the valve actuators. Alternatively, or additionally it is possible to supply pressurized brake fluid to the first pressure generating unit to assist that unit in generating a higher pressure.

In this way the second pressure generating unit may also be used during normal operation, so that the unit is not exclusively provided for a case of failure, despite the redundant construction of the pressure generating units.

In one exemplary arrangement, the brake system includes two brake lines which extend from the second pressure generating unit to the actuator valves and which are fluidically connected by a first connecting line, into which a fluid line from the first pressure generating unit opens. Switchable valves are arranged in the first connecting line between the opening and each of the brake lines, respectively, each of which is switched, in normal operation, to allow fluid flow from the first pressure generating unit to the brake lines and, in an emergency operation, in which the first pressure generating unit has failed, can be switched to prevent fluid flow from the first pressure generating unit to the brake lines.

During normal operation the brake fluid is directed from the first pressure generating unit to both brake lines.

The valves of the connecting line can optionally be switchable also in the assist mode, in which both pressure generating units are operated simultaneously, to prevent fluid flow from the first pressure generating unit to the brake lines.

In the event of failure of the first pressure generating unit or by additional operation of the second pressure generating unit it can be prevented in a simple manner, that the brake fluid is pushed back during operation from the second pressure generating unit to the first pressure generating unit, and, where appropriate, is transferred into the reservoir.

In addition, temporarily opening these valves allows to relieve the pressure of the brake actuators in the event of failure of the first pressure generating unit and during use of the ABS system, if applicable by. In that way, an ABS functionality is provided even during failure of the first pressure generating unit.

In a further exemplary arrangement, a second connecting line may be provided that forms a parallel circuit to the first connecting line, into which a fluid line of the first pressure generating unit opens, wherein switchable valves are arranged in the second connecting line between the opening and each of the brake lines, and each of which is switched to allow fluid flow from the first pressure generating unit to the brake lines in normal operation, and in an emergency operation, in which the pressure generating unit has failed, can be switched to prevent fluid flow from the first pressure generating unit into the brake lines. This variant is used if the first pressure generating unit has two separate hydraulic chambers for generating pressure, each of which being able to supply the brake circuit.

In the event of failure of the first pressure generating unit, closing the valves can prevent brake fluid from being unintentionally returned to the first pressure generating unit.

In the assist mode, the valves in the second connecting line are open, so that pressurized brake fluid can be conducted to the first pressure generating unit via the second connecting line to provide a higher peak brake pressure, as stated above.

In one exemplary arrangement, no additional direct fluid connection between the brake lines is provided, resulting in a very simple brake circuit.

It is possible to realize the entire brake circuit with the actuator valves and the in total four valves in the connecting lines, resulting in a very compact brake system.

The first and second pressure generating unit have separate power supplies and functionally separated control units, which are independent from each other, to ensure a high degree of redundancy. The actuator valves should be designed in such a way, that they can be actuated by either of the first and the second control unit of the two pressure generating units, so that not twice the number of valves needs to be installed.

The switchable valves in the first connecting line are designed to be actuated by each of the control unit of the first pressure generating unit and the control unit of the second pressure generating unit. The switchable valves in the second connecting line may be designed to be actuated only by the control unit of the second pressure generating unit, as they only need to be switchable in case of failure of the first pressure generating unit.

For example, the control electronics are designed in duplicate in the valves that are controllable by the control units, wherein a dual coil winding can be used for solenoid valves to enable both power supplies to supply the current required for switching.

In one exemplary arrangement, the wheel sensors which measure for example a rotational speed of the respective vehicle wheel are designed in such a way that each of the control units can activate them.

Such a redundant design ensures a substantially normal driving of the car in case of a failure of one of the pressure generating units, including the ABS functionality.

It is possible to combine at least the electric motors of both pressure generating units and their control units in a compact component. This component can include at least part of the hydraulic control elements, for example, the valves.

In one exemplary arrangement, the first pressure generating unit is of a plunger type and the second pressure generating unit is formed by at least one pump.

When using a dual-acting plunger type, one of the two connecting lines is advantageously connected with a forward-chamber and the other one with a backward-chamber, the piston of the plunger being positioned between the two, so that by every movement the piston of the plunger type is pushing brake fluid into both brake lines.

A dual-acting-plunger arrangement allows, if applicable, to position the piston of the plunger arrangement by suitable control of the valves in the connecting lines in such a way that brake fluid can be discharged through the plunger arrangement into the reservoir in order to relieve the pressure on the brake actuators, even if the first pressure generating unit has a failure.

If the second pressure generating unit is part of an anti-blocking system and therefore is useable in two functions, the number of components of the brake system can further be reduced to save installation space and costs.

It is possible to design the second pressure generating unit with a smaller peak power than the first pressure generating unit.

In one exemplary arrangement, a piston type pump can be used as the second pressure generating unit.

The second pressure generating unit is fluidically directly connected to the actuator valves, without additional fluidically interposed valves.

The second pressure generating unit is for instance arranged to supply to two brake circuits, particularly via the above mentioned two brake lines, in each of which at least two actuator valves are arranged. In this way a dual-circuit brake system can be archived, which allows a deceleration of the vehicle in case of failure of one of the brake circuits.

Since the first pressure generating unit can supply brake fluid to both brake lines, as described above, this is also possible with only the first pressure generating unit. For this purpose, the brake fluid should be fed into both brake lines upstream of the second pressure generating unit.

A method with the following steps is also disclosed. During normal operation, the first pressure generating unit provides the desired brake pressure in the brake circuit up to a normal-peak-value. Any additional potential peak-brake pressure, which exceeds the normal-peak-value, is supplied by the second pressure generating unit. During an emergency operation, when the second pressure generating unit fails, the entire brake pressure is generated by the first pressure generating unit, wherein the brake pressure is limited to the normal-peak-value. During an emergency operation, when the first pressure generating unit fails, the entire brake pressure in the brake circuit is generated by the second pressure generating unit, wherein the brake pressure is limited to the normal-peak-value or a subjacent emergency-peak-value.

The emergency-peak-value represents the brake fluid pressure that can be provided by the second pressure generating unit at a maximum inside the brake lines. This pressure must be selected high enough to ensure safe braking of the vehicle.

The brake system is designed to be fully redundant by the two pressure generating units each being controllable separately and able to activate all valve actuators, respectively.

During normal operation only the first pressure generating unit is working, apart from short-term peak brake pressure demand in which case both pressure generating units work collectively. During an emergency operation, where one of the two brake pressure generating units has a failure, the entire brake pressure is supplied by the remaining one of the pressure generating units. The brake system is designed in such a way that a sufficiently high brake pressure can be achieved, which allows normal driving of the vehicle.

BRIEF DESCRIPTION OF DRAWINGS

Exemplary arrangements of the present disclosure are explained in more detail below with reference to the accompanying drawings showing.

DETAILED DESCRIPTION

Figure 1:
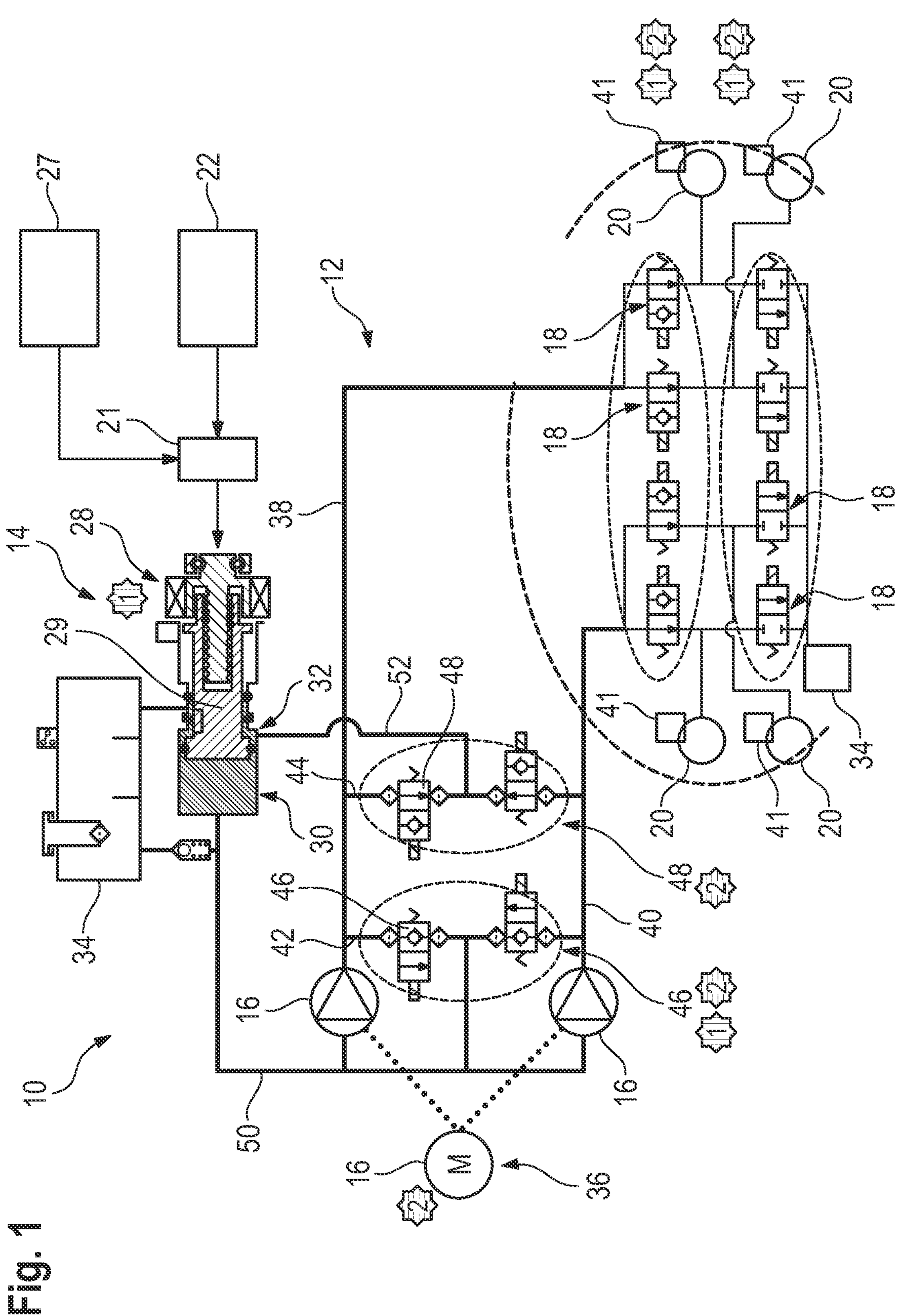
FIG. 1 a schematic illustration of a brake system according to the disclosure.

FIG. 1 depicts an integrated brake system 10 for a vehicle.

A hydraulic brake circuit 12, in which each of a primary first pressure generating unit 14 and a second pressure generating unit 16 is arranged, is connected to actuator-valves 18, each of which is assigned to a brake actuator 20 on a vehicle wheel.

The depicted brake system 10 is designed for a vehicle with four wheels in total.

Both brake pressure generators 14, 16 are designed to be operated only electro-mechanically. Further brake pressure generators are not provided in this example.

The brake system 10 is designed as a brake-by-wire system and/or as an autonomous or semi-autonomous system. It comprises a data interface 21 through which a braking command is transmitted exclusively electronically to the braking system 10

A potential driver brake request is detected by a pedal simulator 22, that transmits the brake command electronically to a control unit 24, 26 of the first or second pressure generating unit 14, 16. There is no direct possibility for the driver to influence the brake pressure in the brake circuit 12, for example via a mechanical force transmission by a present master cylinder.

In an optional autonomous mode, a brake command is generated without the influence of a driver via a superior control unit 27 in the vehicle and is transmitted electronically to the brake system 10 and the control units 24, 26.

In this example the first pressure generating unit 14 is realized as a dual-acting plunger arrangement. An electric motor 28 drives a displaceable piston 29 which delimits two hydraulic chambers, a forward-chamber 30 and a backward-chamber 32, both of which are connected with the brake circuit 12. To this extent, the piston 29 is coupled with an electrically bi-directionally operable spindle-transmission. Reducing the volume in one of the chambers 30, 32 results in brake fluid being pushed into the brake circuit 12.

The first pressure generating unit 14 is fluidically connected to a reservoir 34 from which brake fluid can be drawn into the plunger type arrangement when the piston 29 is moving. The brake system 10 features only one reservoir 34. The utilization of additional low-pressure-accumulators, which re-direct buffered brake fluid into the reservoir 34, is not intended.

The second pressure generating unit 16 is in this case a piston-pump-type, that is driven by a pump motor 36. In this example the second pressure generating unit 16 is part of an ABS-system of the brake system 10.

During operation, both pistons of the second pressure generating unit 16 supply pressurized brake fluid into the brake circuit 12, when the pump motor 16 is running and are therefore depicted as two separated components in FIG. 1.

From the second pressure generating unit 16 a first brake line 38 and a second brake line 40 lead to the actuator valves 18, whereby each brake line 38, 40 is connected to the actuator valves 18 of two brake actuators 20. This is done crosswise, so that in this example the first brake line 38 is connected to the brake actuators 20 of the right rear wheel and right front left wheel, and the second brake line 40 is connected to the brake actuators 20 of the left rear wheel and right front wheel. With the brake lines 38, 40 a dual-circuit brake system is realized.

The actuator valves 18 can be realized in any appropriate manner. In this case the actuator valves 18 comprise for each brake actuator 20 an inlet valve for rising the pressure at the brake actuator 20 and an outlet valve for releasing the pressure of the respective brake actuator 20. If a pressure is to be built up at the brake actuator 20, the respective outlet valve will be shut, and the respective inlet valve will be opened. If the brake actuator 20 is to be relieved from pressure that was built up previously at the brake actuator 20, the respective outlet valve will be opened, and the respective inlet valve will be closed. The actuator valves 18, in this case the each of the outlet valves, respectively, are connected to a line leading back to the reservoir 34.

Furthermore, on every vehicle wheel, a wheel sensor 41 is arranged for detecting the current rotation speed of the wheel.

Both brake lines 38, 40 are fluidically connected by two connection lines 42, 44, that are connected in parallel, and in each of which two switchable valves 46, 48 are arranged. A respective fluid line 50, 52 ends between the two switchable valves 46, 48 of each of the connection line 42, 44 of the forward chamber 30 and backward chamber 32 of the first pressure generating unit 14, respectively.

The actuator valves 18 and the valves 46, 48 are solenoid operated, and are switchable between an open and a closed position.

Optionally, in the closed position a fluid passage in one direction is possible and depicted in FIG. 1 by a check valve. The valves 18, 46, 48 can be installed in a normally open or a normally closed position (in a not activated, de-energized condition open or closed).

The fluid line 50 is connected to the second pressure generating unit 16 additionally, as depicted in FIG. 1.

Figure 2:
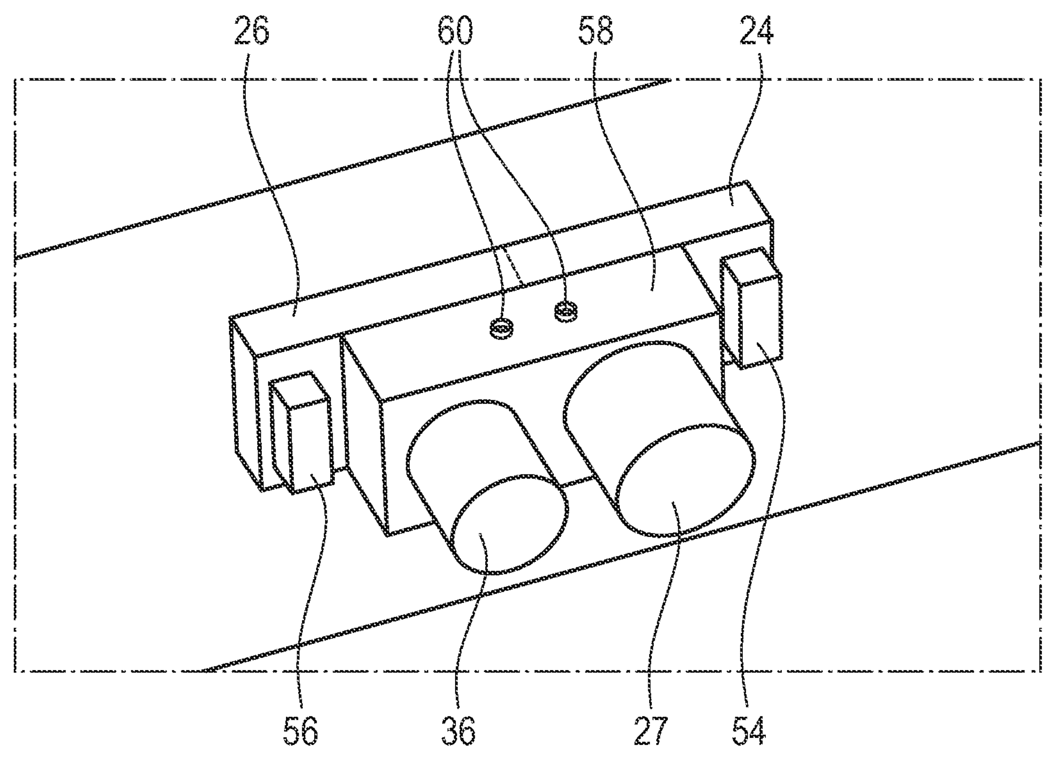
FIG. 2 a schematic illustration of integrated components of the brake system according to FIG. 1.

As shown in FIG. 2, both electric motors 28, 36 and, if applicable, the entire pressure generating units 14, 16, both control units 24, 26 and for example the entire hydraulic control unit 58 of the brake circuit 12, and, if applicable, some or all valves 18, 46, 48, are combined in a single component. The hydraulic control unit 58 is connected by reservoir connectors 60 with the reservoir 34.

The control units 24, 26 of the first and second pressure generating unit 14, 16 are functionally independent from each other. Both pressure generating units 14, 16 have separate power supplies 54, 56, or power supply connectors, (see FIG. 2) through which the corresponding electric motor 28, 36 is supplied. Due to the designed redundancy, the brake system 10 can continue working with the other one of the pressure generating units 14, 16, even when one of the pressure generating units 14, 16 fails or one of the power supplies 54, 56 or one of the control units 24, 26 fails.

The actuator valves 18 as well as the valve 46 in the first connection line 42 are designed in such a way that they can be actuated separately from both control units 24, 26. To that end both valves 18, 46 are equipped with duplicated control units for example, as well as dual winded coils, that are connected with a corresponding one of the control units 24, 26. In FIG. 1 this is indicated with the label "1" for an activation by control unit 24 of the first pressure generating unit 14 and "2" for an activation by control unit 26 of the second pressure generating unit 16.

Also, the wheel sensor 41 are designed in such a way that both control units 24, 26 can read them independently.

The brake system 10 can work in a normal operation, in which all components, including the first and second pressure generating unit 14, 16, are working undisturbed. During normal operation the entire brake pressure is usually supplied by the first pressure generating unit 14.

If however a short-term peak brake pressure is requested during normal operation, which exceeds the normal maximum value that can be supplied by the first pressure generating unit 14 individually, the brake system 10 is operated in an assist mode in which the first and second pressure generating units 14, 16 are activated simultaneously to supply a peak-brake-pressure, that exceeds the normal maximum value.

Furthermore, the brake system 10 can work in an emergency operation mode, in which either the first or second pressure generating unit 14, 16 have failed and only the other one of the pressure generating units 14, 16 is available to then generate the required brake pressure without the other one. Both pressure generating units 14, 16 are designed such that each unit can supply a sufficient brake pressure to operate the brake system 10 and to operate all brake actuators 20.

During normal operation only the first pressure generating unit 14 is working and all valves 46 in the connection line 42 and the valves 48 in the second connection line are opened so that brake fluid from the forward chamber 30 and backward chamber 32 of the first pressure generating unit 14 is directed with the desired pressure to the valve actuators 18 via the brake lines 38, 40.

On requesting a high peak brake pressure the second pressure generating unit 16 is operated additionally in an assistant mode.

While doing so, it is possible to fill up the backward chamber 32 of the first pressure generating unit 14 after emptying its volume by closing the valves 46 in the first connection line 42 to restrict fluid flow, while the valves 48 in the second connecting line 44 are actuated such that a fluid can flow from the brake lines 38, 40 via the fluid line 52 to the first pressure generating unit. The backward chamber 32 can be refilled so that an additional backward stroke of the piston 29 can be executed.

Peak brake pressures of more than 180 bar (180.000 hPa) can be reached in the brake circuit 12 by switching on the second pressure generating unit 16.

The ABS functionality of the brake system 10 is provided unrestrictedly and in a well-known manner using, if applicable, the second pressure generating unit 16.

If the second pressure generating unit 16 fails, the first pressure generating unit 14 provides by itself the entire brake pressure for the brake circuit 12.

During this emergency mode and normal operation the valves 46 and the valves 48 are switched in such a manner to allow brake fluid to flow from the first pressure generating unit 14 via the connecting lines 42, 44 into the brake lines 38, 40.

Only the assist mode by the second pressure generating unit and thus the achievement of above the normal maximum value of the braking pressure which can be provided by the first pressure generating unit alone, is not possible.

In case the first pressure generating unit 14 fails, the second pressure generating unit 16 supplies the entire brake pressure for the brake circuit 12.

If the power of the second pressure generating unit is designed to be lower compared to the first pressure generating unit, the achievable emergency maximum value of the brake pressure in this emergency mode is below the normal maximum value of the brake pressure achievable by the first pressure generating unit alone. However, the emergency maximum value is still selected to be high enough to allow proper operation of the braking system and safe driving of the vehicle.

The second pressure generating unit 16 supplies the desired brake pressure directly to the first and second brake lines 38, 40.

The valves 46 and the valves 48 are normally closed to prevent back flow of brake fluid from the brake lines 38, 40 via the fluid lines 50,52 to the first pressure generating unit 14 and, if applicable, into the reservoir.

A pressure modulation in the brake lines 38, 40 by the dump valves of the actuator valves 18 is possible.

Brake fluid can be fed back to the reservoir 34 to relieve the brake actuators 20 by opening the valves 48 in the second connecting line 44 for a short time to allow a fluid flow through the fluid line 52 and the backward chamber 32 of the first pressure generating unit 14.

An ABS control is still possible. To this end the valves 46 in the first connection line are optionally opened to guide brake fluid in a short circuit back to the second pressure generating unit 16. Such a control may result in a rise in pressure in the fluid line 50 and displacement of the piston 29 in the forward chamber 30 of the first pressure generating unit 14 in a direction of its neutral position so that brake fluid can be released via the fluid line 52 into the reservoir 34 in order to relieve the brake actuators 20.

During emergency mode all actuator valves 18 and the respective valves 46, 48 are always controllable.

All valves 18, 46, 48 can designed in any random suitable manner to archive the described function, also differing from the designs explained above.

The invention claimed is:

1. A brake system of a vehicle, comprising:

an electronic data interface for transmitting a brake command, wherein the brake command can be transmitted exclusively electronically to the brake system, a first and a second electromechanical pressure generating unit, each having a separate power supply and a functionally separate control unit, the first and second pressure generating units being hydraulically connected to a hydraulic brake circuit, a plurality of actuator valves, each of which is assigned to a brake actuator on a vehicle wheel and each of which is configured to selectively pressurize and depressurize the brake, wherein each of the pressure generating units is designed to be able to apply sufficient braking pressure to actuate all brake actuators, wherein the actuator valves are designed to be controlled by either the first control unit or the second control unit, wherein the brake circuit includes two brake lines extending from the second pressure generating unit to the actuator valves and fluidically connected by a first connecting line, into which a fluid line from the first pressure generating unit opens, wherein switchable valves are arranged in the first connecting line between the opening and the brake lines, each switchable valve, in a normal operation, is switched to allow fluid flow from the first pressure generating unit to the brake lines.

2. The brake system according to claim 1, wherein the brake system is designed such that the second pressure generating unit can support the first pressure generating unit in an assist mode to increase an overall pressure in the brake circuit.

3. The brake system according to claim 1, wherein the switchable valves are configured, in an emergency operation in which the first pressure generating unit has failed, to be switchable to prevent fluid flow from the first pressure generating unit to the brake lines.

4. The brake system according to claim 1, wherein the switchable valves arranged in the first connecting line are designed to be actuated by each of the first control unit and the second control unit.

5. The brake system according to claim 1, wherein the first pressure generating unit is of a plunger arrangement and the second pressure generating unit is formed by at least one pump.

6. The brake system according to claim 1, wherein the second pressure generating unit is fluidically directly connected to the actuator valves.

7. The brake system according to claim 1, wherein the second pressure generating unit is arranged to control two brake circuits via two brake lines, in each of which at least two of the actuator valves are arranged.

8. The brake system according to claim 2, wherein the switchable valves are configured in an emergency operation, in which the first pressure generating unit has failed, to be switchable to prevent fluid flow from the first pressure generating unit to the brake lines.

9. The brake system according to claim 8, wherein a second connecting line is provided as a parallel circuit to the first connecting line, wherein a fluid line from the first pressure generating unit opens into the second connecting line, wherein switchable valves are arranged in the second connecting line between an opening and the brake lines, respectively, which each, in normal operation, is switched to allow fluid flow from the first pressure generating unit to the brake lines, and in an emergency operation, in which the pressure generating unit has failed, can be switched to prevent fluid flow from the first pressure generating unit to the brake lines.

10. The brake system according to claim 1, wherein the switchable valves arranged in the second connecting line are designed to be actuated only by the second control.

11. The brake system according to claim 5, wherein the second pressure generating unit is part of an anti-blocking system of the brake system.

12. The method for operating a brake system as claimed in claim 1, comprising:

during normal operation the first pressure generating unit generates a desired brake pressure in the brake circuit up to a normal-peak-value, and any additional potential peak-brake pressure, which exceeds the normal-peak-value, is supplied by the second pressure generating unit, during an emergency operation, when the second pressure generating unit fails, the entire brake pressure is generated by the first pressure generating unit, wherein the brake pressure is limited to the normal-peak-value, and during an emergency operation, when the first pressure generating unit fails, the entire brake pressure in the brake circuit is generated by the second pressure generating unit, wherein the brake pressure is limited to the normal-peak-value or a lower emergency-peak-value, which is the maximum pressure the second pressure generating unit can safely provide.

13. A brake system of a vehicle, comprising:

an electronic data interface for transmitting a brake command, wherein the brake command can be transmitted exclusively electronically to the brake system, and first and second electromechanical pressure generating units which can implement the brake command and which are hydraulically connected to a hydraulic brake circuit, wherein the brake system has a plurality of actuator valves, each of which is assigned to a brake actuator on a vehicle wheel and each of which can selectively pressurize and depressurize the brake, wherein each of the first and second pressure generating units is designed to be able to apply sufficient braking pressure to actuate all brake actuators, wherein the brake circuit includes two brake lines which extend from the second pressure generating unit to the actuator valves and which are fluidically connected by a first connecting line, into which a fluid line from the first pressure generating unit opens, and wherein switchable valves are arranged in the first connecting line between an opening and the brake lines, respectively, which each, in normal operation, is switched to allow fluid flow from the first pressure generating unit to the brake lines and, in an emergency operation, in which the first pressure generating unit has failed, can be switched to prevent fluid flow from the first pressure generating unit to the brake lines wherein a second connecting line is provided as a parallel circuit to the first connecting line, wherein a fluid line from the first pressure generating unit opens into the second connecting line, wherein switchable valves are arranged in the second connecting line between an opening and the brake lines, respectively, which each, in normal operation, is switched to allow fluid flow from the first pressure generating unit to the brake lines, and in an emergency operation, in which the pressure generating unit has failed, can be switched to prevent fluid flow from the first pressure generating unit to the brake lines.

14. The brake system according to claim 13, wherein the first pressure generating unit is a plunger arrangement and the second pressure generating unit is formed by at least one pump.

15. The brake system according to claim 13, wherein the second pressure generating unit is fluidically directly connected to the actuator valves.

* * * * *